July 28, 1970 W. G. FREISE ET AL 3,521,791
BEVERAGE DISPENSING DEVICE
Original Filed Aug. 3, 1965 2 Sheets-Sheet 1
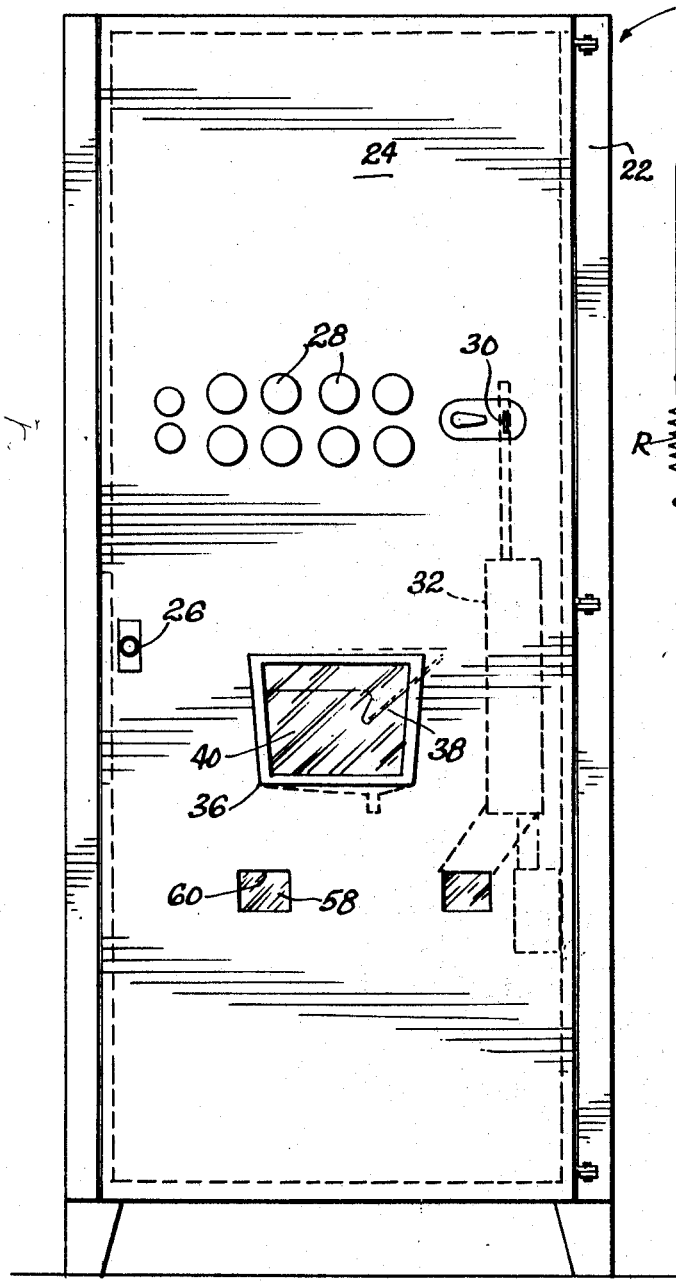
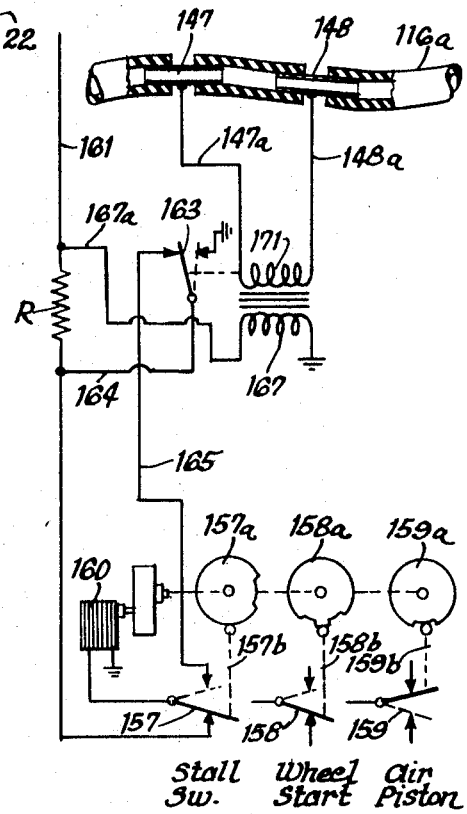
INVENTORS
William G. Freise and
Benjamin M. Przybyszewski
by Mullin & Siegel
Attys

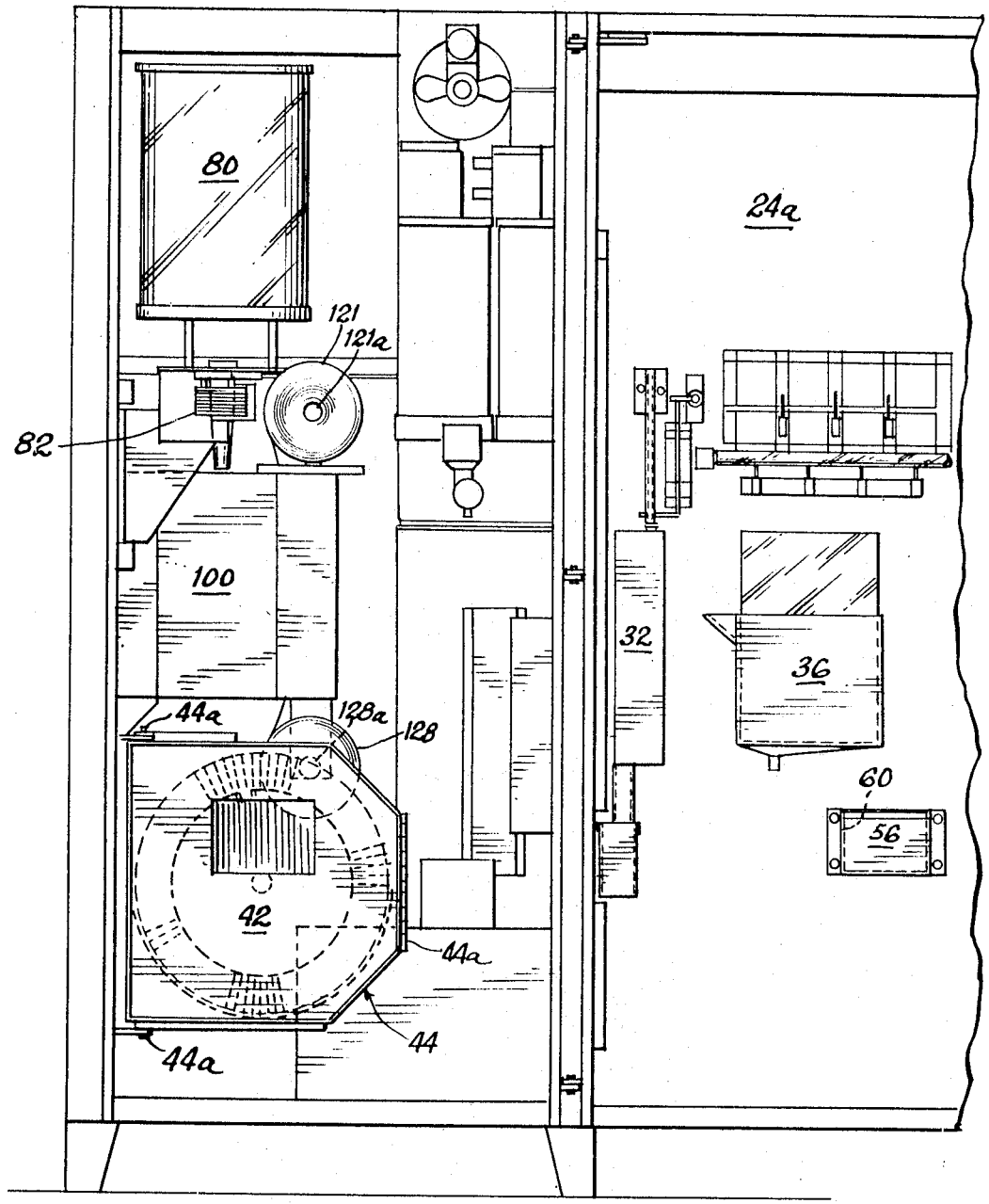

United States Patent Office 3,521,791
Patented July 28, 1970

3,521,791
BEVERAGE DISPENSING DEVICE
William G. Freise and Benjamin M. Przybyszewski, Chicago, Ill., assignors, by mesne assignments, to Paymax Syrup Corporation, Chicago, Ill., a corporation of Illinois
Original application Aug. 3, 1965, Ser. No. 476,977, now Patent No. 3,421,430, dated Jan. 14, 1969. Divided and this application Apr. 12, 1968, Ser. No. 769,457
Int. Cl. B67d 5/14
U.S. Cl. 222—64                               1 Claim

ABSTRACT OF THE DISCLOSURE

A beverage dispensing machine has an urn with a discharge conduit having a pair of spaced electrodes therein. When no liquid is present to complete a circuit between the electrodes, a coil is deenergized to prevent further dispensing.

---

This invention relates to a liquid dispensing device for beverages and, more particularly, to a liquid dispensing device that enables the individual brewing of beverages.

This application is a division of our co-pending application, Ser. No. 476,977 filed Aug. 3, 1965, now Pat. No. 3,421,430 of Jan. 14, 1969.

In brewing beverages individually for dispensing in the vending industry the flavor thereof is of primary importance. Although liquid dispensing devices in the past have individually brewed beverages, mechanical failure usually rendered them incapable of dispensing tasty beverages. Our device in obviating the probability of mechanical failure by mechanical simplicity not only accomplishes individual brewing, but also dispenses beverages which are both flavorful and appealing. It should be understood, that although we will describe our device with relation to coffee and tea brewing, our device is equally adapted to other comparable beverages. It is therefore a primary object of this invention to provide a new and improved beverage dispensing device which brews coffee that is tasty with a structure which is both simple and foolproof in operation.

It is still further an object of this invention to produce a new and improved beverage dispensing device that individually brews coffee for vending purposes.

Still even further, our liquid dispensing device incorporates a new and improved tea bag dispenser which furnishes individual bags of tea for selectible brewing thereof with hot water.

Another feature of our invention resides in the provision of electrical means for controlling the brewing time of our new and improved brewing device in accordance with the actual time it takes for the hot liquid to be forced through the brewing chamber and filter paper.

Other and further objects and features of our invention will become more readily apparent from the following description when read in conjunction with the drawings wherein:

FIG. 1 is a side elevational view of the front of our new and improved beverage dispensing device when the door thereof is closed;

FIG. 2 is a side elevational view of the front of our new and improved beverage dispensing device with the front door thereof opened; and FIG. 3 is a diagrammatic view illustrating the circuitry of our electrical means for controlling the brewing time of our new and improved brewing device.

Referring generally to the drawings, the improvements contributed by our beverage dispensing device can be said to reside in two general areas—our tea bag dispenser and our improved coffee brewing arrangement. Our tea bag dispenser automatically dispenses tea bags individually along with hot water from the machine so that the operatior of the machine can mix the tea with the hot water to produce tea of varying strength. Our new brewing arrangement brews coffee individually with mechanical simplicity and includes the aforestated new features relating to predetermined feeding of hot water, feeding and dispensing the filter paper so that new filter paper can be used for brewing each cup of coffee, keeping the brewing chamber clean and finally electrically controlling the length of brewing time in accordance with the actual mixing of the hot water and coffee. Since the sequence of operations of our device is controlled by conventional timing motor operated cams and switches and the circuitry with regard to same is generally well known, the description of the circuitry, with the exception of our electrical means for controlling the length of brewing in accordance with the actual mixing of the hot water and coffee will here be omitted.

Referring more particularly to the drawings wherein like characters of reference indicate corresponding parts throughout, the front of our new and improved beverage dispensing device 20 is generally illustrated in FIG. 1. As in other vending devices, it is housed in a cabinet 22 which has a front door 24 hingedly associated therewith, said front door having a key lock 26 for security means. Various actuating buttons 28 protrude through the front door 24 to enable the operator of our dispensing device to select a desired drink by actuation thereof after a coin has been inserted in the coin slot 30. The coin slot 30 is associated with a coin acceptance machine 32 in the usual and well-known manner so that when a coin is inserted in the coin slot the beverage dispensing device is actuated into operation. Once the vending machine is actuated into operation, the beverage to be dispensed is brewed and a cup (not shown) is disposed in a cup magazine 36 via a cup chute 38 and thereafter receives the brewed beverage. The cup magazine 36 which has an access door 40 is opened and access to the cup and beverage contained therein is gained.

Referring to FIG. 2, the front of the inside of the beverage dispensing device 20 can be seen together with the back 24a of the front door 24. Our new and improved tea bag dispenser 42 is preferably illustrated as being proximately disposed to the bottom of our device.

As mentioned before, our beverage dispensing device is operated by a series of timer motors that operate a series of cams to actuate the circuits of our device sequentially. As in other well known circuits such as disclosed in U.S. Pat. Nos. 2,813,965; 2,953,171; 2,935,010; each of the sequential operations of our device is interrelated and the preceding operation must be completed before the next operation is set into motion. To illustrate how our electrodes work with regard to a series of motor operated cams and switches, in FIG. 3 we show a series of motor operated cams that could be used to actuate our brewing device. It will be noted that a spring biased stall switch 157 is electrically connected in series with a wheel start switch 158, and a spring biased air piston switch 159. All of the switches have follower mechanisms 157b, 158b and 159b that make them adaptable for association with cams. The stall switch 157 is mechanically associated with a stall cam 157a as are the wheel start cam 158a and the air piston cam 159a. All of the cams 157a, 158a and 159a are rotatably mounted on the shaft of the coffee timer motor and have grooves therein for allowing the switches to close when the grooves are in alignment with the followers 157b, 158b and 159b on the spring biased switches 157, 158 and 159. When the followers are so aligned, the wheel and the air piston can be actuated by various circuits (not shown). It will be noted that one side of the stall switch is connected to an electrode relay 163 by means of a lead 165. The electrode relay 163 is shown in its normally closed position and in this position voltage from the hot lead 161 can be impressed on the stall switch 157 when it moves into its closed position which is illustrated in dotted lines. A primary coil 167 which is grounded on one side is also connected to the hot lead 161 by means of the lead 167a. A secondary coil 171 is proximately disposed with relation to said primary coil and is electrically connected to the electrodes 147, 148 by means of the leads 147a, 147b. Thus, when current can flow between the electrodes 147 and 148, a circuit is completed in the secondary coil and the electrode relay 163 is actuated to its closed position which is shown in dotted lines. In its closed position the electrode relay 163 is grounded. When the electrode relay is in its closed position, current normally flowing to the timer motor flows through the resistance R and is clamped to ground by flowing through the electrode relay 163 and lead 164. Thus, all of the cams riding on the coffee timer motor, which is de-energized, are halted. The sequence of operations in our dispensing device is stopped until there is no longer any current flowing between the electrodes 147, 148 and the electrode relay is in its normal closed position. Thus it can be seen without going into detail as to the operations of the rest of the cams and switches that once there is no longer any liquid flowing through the conduit 116a, the electrode relay 163 is in its closed position and the normal sequence of operation of the coffee brewing mechanism can proceed in accordance with the time sequence of the motor operated cams as has been explained in the aforementioned U.S. patents.

It is believed that our invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of our invention as defined in the appended claim.

What is claimed is:

1. In a beverage dispensing machine that has at least one urn to individually brew beverage by mixing flavorant with a predetermined amount of hot liquid, said dispensing machine having a timer motor rotatably driving cams to actuate a certain sequence of operations in said machine after said beverage is brewed, a conduit leading from said urn, a pair of tubular electrodes disposed in said conduit and connected in circuit with a secondary coil, a primary coil proximately disposed and electrically coupled with relation to said secondary coil, said primary coil having a voltage impressed thereon when said dispensing machine is in operation, and an electrode relay operatively associated with said secondary coil and connected in circuit with said timing motor to de-energize the same when said secondary coil has current flowing therethrough, said secondary coil having current flowing therethrough when liquid flows through said conduit between said electrodes, whereby said beverage machine has its sequence of operations halted after brewing beverage if there is liquid still flowing through said conduit between said tubular electrodes.

References Cited

UNITED STATES PATENTS

| 2,867,354 | 1/1959 | Tanzola | 222—64 |
| 3,270,918 | 9/1966 | Goodrich et al. | 222—64 |

SAMUEL F. COLEMAN, Primary Examiner

H. S. LANE, Assistant Examiner

U.S. Cl. X.R.

200—61.05; 222—76